Nov. 22, 1927.

A. E. WEINGARTNER

SEPARABLE COUPLING

Filed March 12, 1925

1,650,557

2 Sheets-Sheet 1

Inventor—
Anthony E. Weingartner.
by his Attorneys.
Howson & Howson

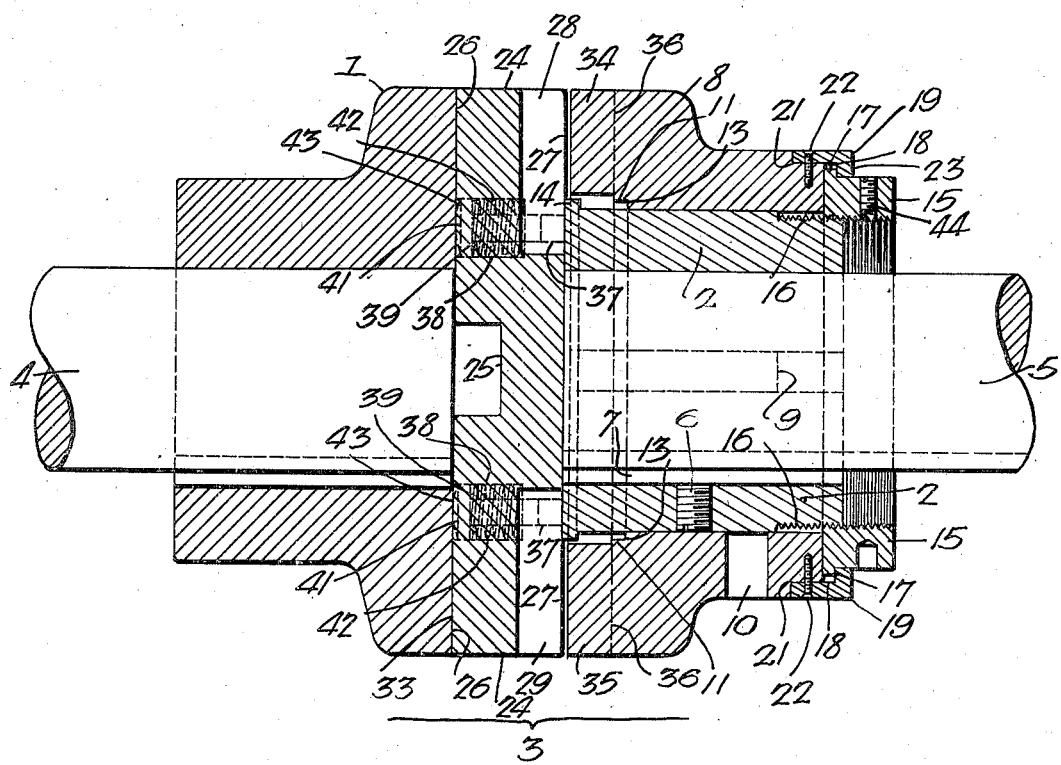

Patented Nov. 22, 1927.

1,650,557

UNITED STATES PATENT OFFICE.

ANTHONY E. WEINGARTNER, OF BETHLEHEM, PENNSYLVANIA, ASSIGNOR TO AMERICAN ENGINEERING COMPANY, OF PHILADELPHIA, PENNSYLVANIA, A CORPORATION OF PENNSYLVANIA.

SEPARABLE COUPLING.

Application filed March 12, 1925. Serial No. 14,956.

My invention relates to such couplings as are adapted to connect a driving shaft and a driven shaft.

One object of my invention is to provide a device of the class described which shall be characterized by simplicity of design, and inexpensiveness and ease of assembly with or removal from its associated parts.

A disadvantage of the prior art couplings of the above-noted type is that when the driving shaft is to be disconnected from the driven shaft, one or the other of these shafts must be bodily removed, thus causing a great loss in time and consequent difficulties in maintenance and operation. Another object of my invention, therefore, is to provide a separable coupling that shall avoid these difficulties and still be relatively simple and inexpensive.

Figure 1:
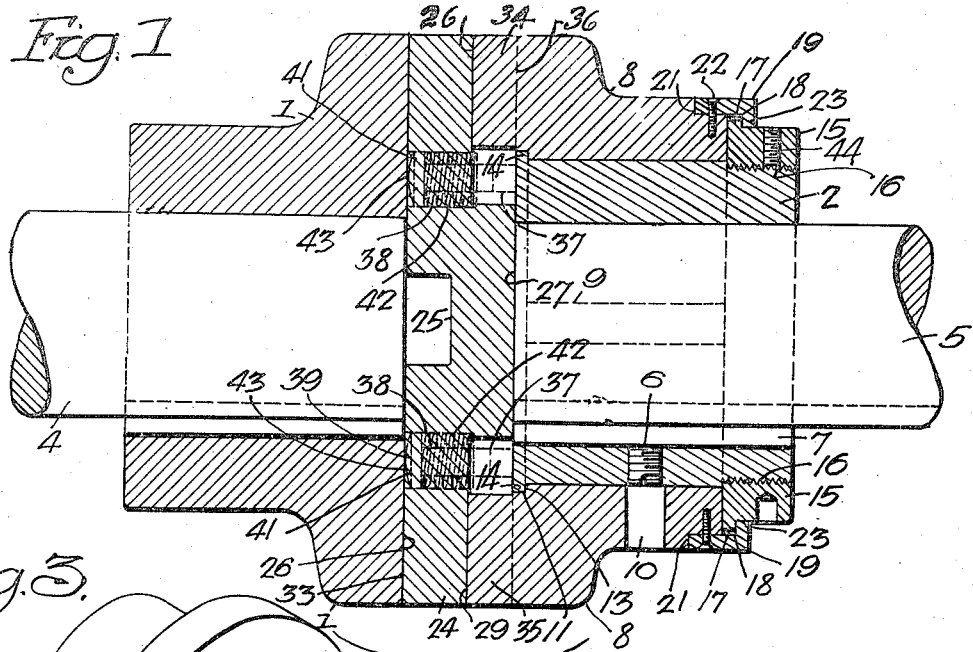
Figure 3:
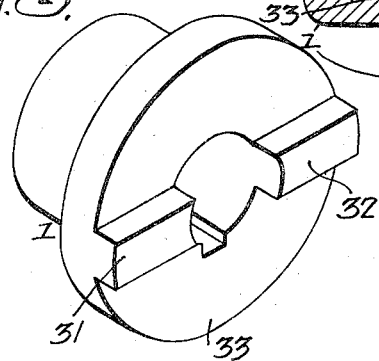
Figure 4:
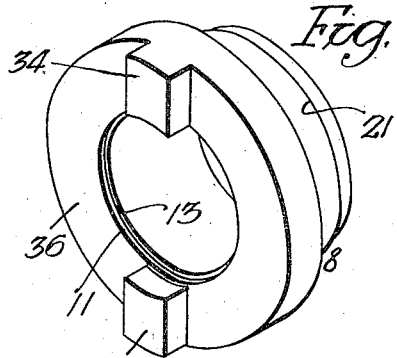
Figure 5:
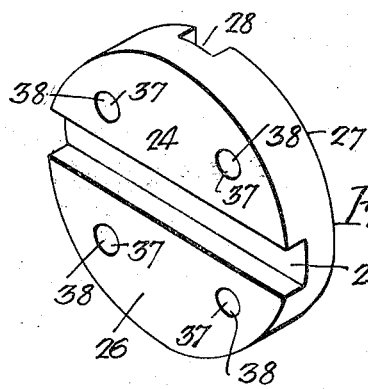

Other objects and applications of my invention, as well as details of construction and operation, whereby my invention may be practiced, will appear more fully hereinafter, when taken in connection with the accompanying drawings, wherein Fig. 1 is a longitudinal sectional view of one form of embodiment of my invention with the coupling disk in interlocking engagement with the associated coupling sleeves;

Fig. 2 is a similar view but showing the movable coupling sleeve in its disengaged position, permitting the removal or the replacement of the coupling disk; and Figs. 3, 4 and 5 are detached perspective views of certain of the coupling elements of Figs. 1 and 2.

In the illustrated embodiment of my invention shown in the drawings, sleeves 1 and 2 of a separable coupling 3 are keyed or otherwise rigidly secured to shaft end portions 4 and 5, respectively. The position of sleeve 2 may be further secured by means of a set screw 3 extending from said sleeve into engagement with a key 7.

A third sleeve 8 is slidably mounted on the fixed sleeve 2 and it may be secured against circumferential movement by means of an axially extending key 9. The sleeve 8 is provided with a perforation 10 which registers with the set screw 6 when the coupling is in the closed or effective position of Fig. 1, whereby access may be had to the set screw 6 should it be desirable to adjust the position of the sleeve 2 on the shaft end portion 5. The bore of the axially movable sleeve 8 may be enlarged at 11 (Figs. 1 and 4) to form a shoulder 13, the latter being movable into engagement with an annular flange 14 (Fig. 1) formed on the inner end of the sleeve 2 when the movable sleeve 8 is in its innermost or interlocking position shown in Fig. 1.

The sleeve 8 may be actuated by means of a nut 15 which is in threaded engagement with an outer end portion 16 of the inner or stationary sleeve 2. One edge of the nut 15 is provided with a circular flange 17 which is movable in an annular recess 18 formed in the movable sleeve 8 by means of a retaining ring 19. The retaining ring 19 may be secured in a recess 21 formed in an outer edge of the movable sleeve 8 by screws 22, and it is provided with a depending flange 23 which engages one side of the circular flange 17 of the nut 15. Thus it is apparent that the turning of the nut 15 in one direction causes a movement of the sleeve 8 from the effective position shown in Fig. 1 to the ineffective positon shown in Fig. 2, but a reverse movement of the nut 15 causes the sleeve 8 to be returned to its original position, all as will appear more fully hereinafter.

The fixed sleeve 1 and the movable sleeve 8 may be mechanically interconnected by means of a coupling disk 24 having a slot 25 extending across one face 26 thereof. An opposite face 27 is provided with recesses 28 and 29, which extend radially inwardly a short distance, as shown in Fig. 1. One advantage of thus partly extending the recesses 28 and 29 across the face 27 of the coupling disk 24 is that a relatively thin coupling disk may be employed without weakening the central portion thereof. The slot 25 is adapted to receive spaced lugs 31 and 32 (Figs. 1 and 3) which extend from an adjacent face 33 of the fixed sleeve 1. Similarly the recesses 28 and 29 are adapted to receive lugs 34 and 35, (Figs. 1 and 4) respectively, which extend from an adjacent face 36 of the movable sleeve 8.

In order to prevent the coupling disk 24 from vibrating during normal operation, I provide a plurality of perforations 37 in the coupling disk 24, said perforations having countersunk portions 38. A plunger 39 is positioned in each perforation, while an enlarged head portion 41 thereof is disposed in the countersunk portion 38 of said perforation. A spring 42, which extends between the base of the countersunk portion 38 and the enlarged head portion 41, serves to cause the rounded outer face 43 of the head portion 41 to engage resiliently the adjacent face 33 of the fixed coupling sleeve 1. The face 27 of the coupling disk 24 is also caused to engage resiliently the adjacent face 36 of the movable coupling sleeve 8 and thus any tendency for the coupling disk 24 to vibrate is greatly minimized.

Assuming the parts in the position shown in Fig. 1, when it is desired to remove the coupling disk 24, a set screw 44, which serves to rigidly secure the nut 15 in position, is loosened and thereafter said nut is turned so as to cause the sleeve 8 to move into the position shown in Fig. 2. The coupling disk 24 may now be disengaged from the sleeves 1 and 8 and readily removed without in any way disturbing the shaft end portions 4 and 5, as would be necessary with the prior art couplings. When it is desired to bring the parts again into the interlocked position shown in Fig. 1, the coupling disk 24 is replaced and the nut 15 is actuated in an opposite direction until the shoulder 13 thereof engages the annular flange 11 of the rigid sleeve 2, in which position of the sleeve 8, the lugs 34 and 35 are respectively disposed in the recesses 28 and 29 of the coupling disk 24.

While I have shown only one embodiment of my invention, for the purpose of describing the same and illustrating its principles of construction and operation, it is apparent that various changes and modifications may be made therein without departing from the spirit of my invention, and I desire, therefore, that only such limitations be made thereon as are indicated in the appended claims or as are demanded by the prior art.

I claim:

1. A coupling for shaft sections comprising a plurality of elements, two of which are rigidly secured to the respective shaft sections, a third element of which is movably mounted on one of said two elements, a fourth element of which is interlocked with the other of said two elements and said third element, and actuating means for said third element carried by its supporting element.

2. A coupling for shaft sections comprising a plurality of elements, one of which is mounted on one of said shaft sections for longitudinal movement from one desired position to another, a second element of which is secured to the other of said shaft sections, a third element of which is so operatively associated with said longitudinally movable element and said second element as to constitute power-transmitting means therebetween, and means so operatively associated with one of said shaft sections as to constitute a nut movable longitudinally of the same upon a rotative movement thereof, said nut being operatively associated with said longitudinally movable element, whereby the turning of the nut may cause the actuation of said last-mentioned element.

3. A coupling for shaft sections comprising a plurality of elements, one element of which comprises a sleeve rigidly secured to one of said shaft sections and provided with a threaded portion, a second element of said coupling being mounted on said sleeve for longitudinal movement and means in threaded engagement with said sleeve, said means being so associated with said second element that a movement of the former causes a longitudinal movement of the latter, other elements of said coupling being respectively mounted on the other of said shaft sections and positioned in engagement with said second element.

4. A coupling for shaft sections comprising a plurality of elements, one element of which is adapted to be rigidly secured to one of said shaft sections, a second element of which is movable into effective and ineffective positions, said second element being keyed to said first-mentioned element, means constituting a nut in threaded engagement with said first-mentioned element, and means operably associating said nut and said second element, whereby a rotative movement of the former causes a longitudinal movement of the latter from one of said positions to the other, other elements of said coupling being respectively secured to the other of said shaft sections and positioned in interlocking relation to said second element when the same is in its effective position.

5. In combination, a pair of sleeves adapted to be secured respectively to a pair of shafts, a third sleeve mounted on one of said sleeves for movement axially of the same, a coupling disk positioned in interlocking engagement with said third sleeve and the other of said pair of sleeves, and means constituting a nut mounted in threaded engagement with one of said pair of sleeves and having such operative connection to said third sleeve that a rotative movement thereof causes an axial movement of said third sleeve.

6. In combination, a pair of sleeves adapted to be secured respectively to a pair of shafts, a third sleeve mounted on one of said sleeves for movement axially of the same, a coupling disk positioned in interlocking engagement with said third sleeve and the other of said pair of sleeves, means constituting a nut mounted in threaded engagement with one of said pair of sleeves and having such operative connection to said third sleeve that a rotative movement thereof causes an axial movement of said third sleeve, and means carried by said coupling disk tending to prevent vibration of the same.

7. A pair of sleeves respectively mounted on a pair of shafts, means for adjustably securing one of said sleeves in a desired position, a third sleeve mounted on said adjustable sleeve for movement longitudinally of the same, a coupling disk having opposite sides in interlocking engagement with the other of said pair of sleeves and said third sleeve, respectively, and means for causing the actuation of said third sleeve into and out of interlocking engagement with said coupling disk.

8. A pair of sleeves adapted to be secured respectively to a pair of shafts, a third sleeve mounted on one of said pair of sleeves for movement longitudinally of the same, a coupling disk having opposite sides in interlocking engagement with the other of said pair of sleeves and said third sleeve, respectively, and means constituting a nut adapted to cause the actuation of said third sleeve into and out of interlocking engagement with said coupling disk, said coupling disk carrying a spring loaded plunger whereby said disk and said plunger may be respectively actuated into engagement with said third sleeve and one of said pair of sleeves.

9. A pair of sleeves adapted to be secured respectively to a pair of shafts, a third sleeve mounted on one of said pair of sleeves for movement longitudinally of the same, a coupling disk having opposite sides in interlocking engagement with the other of said pair of sleeves and said third sleeve respectively, means for causing the actuation of said third sleeve into and out of interlocking engagement with said coupling disk, said coupling disk having a countersunk aperture, a plunger disposed in said aperture and provided with an enlarged head portion positioned in the countersunk portion thereof, and a spring extending between said enlarged head portion and the base of said countersunk portion, whereby said plunger and said disk may be respectively actuated into engagement with certain of said sleeves.

10. A coupling comprising a pair of sleeves adapted to be secured to a pair of shafts, respectively, a third sleeve keyed to one of said pair of sleeves so as to be movable longitudinally of the same, a coupling disk having one face in interlocking engagement with an adjacent face of one of said pair of sleeves and an opposite face in interlocking engagement with the adjacent face of said third sleeve, spring loaded plungers operatively associated with said coupling disk tending to maintain the same in one position, and means constituting a nut in threaded engagement with one of said pair of sleeves, said means having an operative engagement with said third sleeve, whereby the turning of the same causes said third sleeve to move longitudinally of said coupling disk.

11. A separable coupling comprising a pair of sleeves adapted to be secured to a pair of shafts, respectively, a third sleeve keyed to one of said pair of sleeves so as to be movable longitudinally of the same, a coupling disk having its opposite faces in interlocking engagement with the adjacent faces of the other of said pair of sleeves and said third sleeve, respectively, a member in threaded engagement with one of said pair of sleeves and provided with an annular flange, and a retaining ring carried by said third sleeve adapted to cooperate with said annular flange, whereby said third sleeve may be actuated upon the turning of said nut in either direction.

12. A coupling comprising a pair of sleeves mounted on a pair of shafts respectively, one of said sleeves being adjustable, a third sleeve keyed to said adjustable sleeve, a coupling disk having its opposite faces in interlocking engagement with the adjacent faces of the other of said pair of sleeves, and said third sleeve, respectively, a member in threaded engagement with one of said pair of sleeves and provided with an annular flange, a retaining ring carried by said third sleeve adapted to cooperate with said annular flange, whereby said third sleeve may be actuated upon the turning of said member in either direction, and means tending to prevent said coupling disk from vibrating.

13. A shaft coupling comprising a pair of spaced sleeves adapted to be secured to a pair of shafts, a third sleeve mounted for longitudinal movement on one of said pair of sleeves and having a recess, means constituting a nut in threaded engagement with said last mentioned supporting sleeve and provided with a circular flange adapted to extend into said recess, so that the rotation of said nut may cause a longitudinal movement of said third sleeve, and a coupling disk interconnecting said sleeves and freely removable upon the disengagement of said third sleeve therefrom.

14. A pair of spaced shaft end portions, a pair of coupling sleeves respectively secured thereto, one of said coupling sleeves having an inner circular flange, a third sleeve slidably mounted on said last-mentioned sleeve and provided with a shoulder adapted to engage said annular flange when said third sleeve is in a predetermined position, means constituting a nut mounted on said supporting sleeve and having such operative connection to said third sleeve that a movement thereof causes a longitudinal movement of the same, and a coupling disk in interlocking engagement with one of said pair of sleeves, when said third sleeve and the latter is in said predetermining position.

ANTHONY E. WEINGARTNER.